June 1, 1971  R. P. THEISEN  3,582,294
CLADDED VANADIUM BASE ALLOY FOR NUCLEAR REACTOR
Filed Jan. 3, 1968
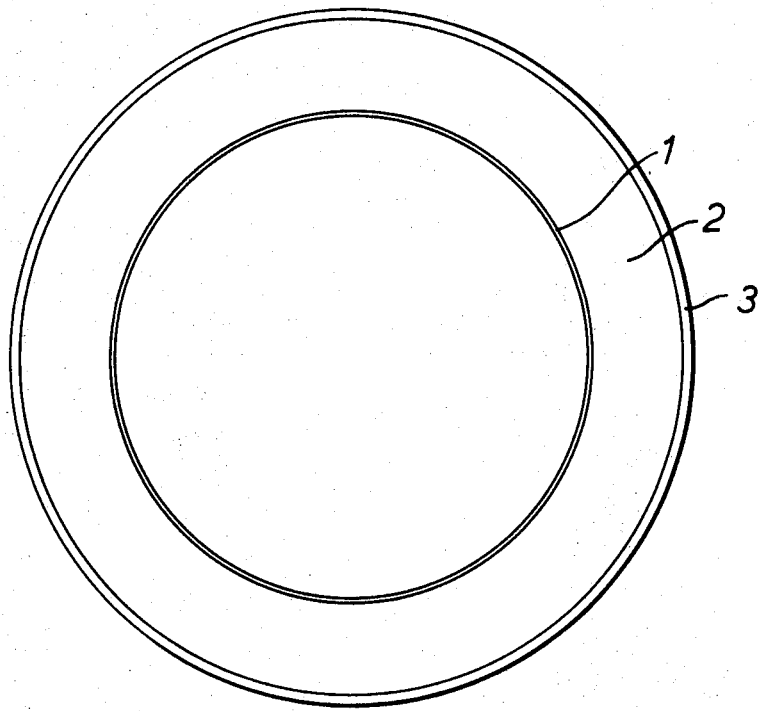
ROGER PIERRE THEISSEN
INVENTOR
BY
ATTORNEY

United States Patent Office 3,582,294
Patented June 1, 1971

3,582,294
CLADDED VANADIUM BASE ALLOY FOR NUCLEAR REACTOR
Roger Pierre Theisen, Luxembourg, Luxembourg, assignor to La Continentale Societe Anonyme, Luxembourg
Filed Jan. 3, 1968, Ser. No. 695,395
Claims priority, application Luxembourg, June 9, 1967, 53,851
Int. Cl. B32b 15/00
U.S. Cl. 29—183.5
5 Claims

ABSTRACT OF THE DISCLOSURE

Clad tubes for metal and ceramic nuclear reactor fuels, particularly for use in fast breeder nuclear reactors, comprising vanadium base alloys of the vanadium-titanium-X type wherein X is chromium or columbium and the process of forming the clad tube which consists essentially of pyrolytically decomposing the halides of the alloy constitutents and depositing the alloy constituents on a mandrel which is removed after completion of the process, thus providing the finished clad tube.

BACKGROUND OF THE INVENTION

In accordance with known nuclear practice, the clad tubes consist usually of thin tubes needed in nuclear reactor applications to insulate reactor fuel elements and their fission products which are generated, from the cooling medium.

In addition to good mechanical strength, thin walled clad tubes to be used in nuclear reactors must show very good high temperature strength, good resistance to oxygen and calcium attack, which elements are found in the cooling medium, and must be sufficiently compatible with the nuclear fuel material. When the clad tubes are used in fast breeder reactors, they must show good resistance to sodium attack, which element is preferably used as a cooling medium in fast breeder reactors.

Due to its favorable neutron-physical properties (neutron cross-section) in combination with its very good high temperature characteristics, particularly, even after substantial exposure to high intensity radiation, the vanadium-base-alloys became of wider interest for application in nuclear reactors.

However, experience with conventional vanadium alloys has indicated that their susceptibility to corrosion attack and their extremely high production costs are a distinct disadvantage and impede their usefulness and application in nuclear reactors.

The extremely high costs of the difficult and sometimes even impossible metallurgical transformation required during the manufacturing process of thin cladding tubes from these high melting alloys present similarly a substantial disadvantage.

DETAILED DESCRIPTION OF THE INVENTION

This invention accordingly is concerned with a process for preparing vanadium-base alloys as cladding materials for metallic and ceramic nuclear reacting fuel, especially for use or application in fast breeder nuclear reactors, and the novel tubes prepared by the process.

The vanadium-base alloys useful in this invention may be said to consist of the vanadium-titanium-X (V-Ti-X) system wherein the titanium (Ti) proportion may vary between 3% and 50%, by weight, and may represent for X a chromium (Cr) or columbium (Cb) concentration between 5 and 20%, by weight, the remainder consisting of the base characterizing material of the alloy, which is vanadium. It may contain small additional amounts of silicon or aluminum which occur therein as a dispersed phase.

In accordance with the present invention, thin walled cladding tubes are obtained by a pyrolytic decomposition of mixtures of the halides (fluorides or chlorides) of the high melting alloy elements according to the technologically known as fluidized bed process in the presence of a reducing gas, preferably hydrogen, at a temperature ranging from 400° to 1000° C., thereby to deposit the metal formed from the halide on a heated forming body or mandrel which is removed by an appropriate method after completion of the process, thus providing the finished cladding tube.

It is an advantage in accordance with the invention to control the deposition of the alloying elements on the mandrel in such a way that the main layer of the tube consists of the heat-resistant vanadium-titanium-X alloy in a ratio, for example, of 15% titanium, 7.5% chromium, balance vanadium, or 3% titanium, 15% columbium, balance vanadium. The outer layer or anti-corrosion layer preferably is formed to have a coating thickness of 30 to 150 microns and to consist of a corrosion resistant vanadium-base alloy, for example, of a binary alloy of 40% titanium, balance vanadium, or 50% titanium, balance vanadium.

The inner layer which is in contact with the nuclear fuel material consists either of the same heat resistant vanadium-titanium-X alloy as the main layer or of a vanadium-20% chromium-alloy or of vanadium-5% rhenium alloy, as an anti-diffusion barrier. This anti-diffusion layer then has a thickness of 10–100 microns and increases the compatibility of the cladding material with the atomic fuel.

For a better understanding of the invention reference may be had to the accompanying drawing in which the clad tube made in accordance with the invention is shown in cross-section. In the drawing it is to be understood that the particular embodiment with respect to length and diameter is not intended to serve as a limitation on the invention but it is here for purposes of illustration. The total wall thickness of the shown clad tube of FIG. 1 consists of an inner anti-diffusion barrier 1, a main layer 2 and a corrosion protective layer 3.

The corrosion resistance of these alloys is additionally increased with reference to comparable alloys produced by conventional, non-pyrolytic process in that no stresses are produced as a result of the forming operations which, the same as the typical structure, cannot be completely eliminated by stress relieving annealing in vacuum.

A further advantage of this manufacturing process consists in that, as in the case of uranium alloys, the grain size of the pyrolytic alloys is minimized by small fluoride content (about 15 p.p.m.) and does not grow after heat treatment to about 1000° C.

SPECIFIC EXAMPLE

For purposes of this specific embodiment, the circumference of the tube may be assumed to be circular and its diameter inside to be six millimeters. The anti-diffusion barrier has a thickness of about 30μ, the main layer a thickness of 800μ and the anti-corrosion layer a thickness of 70μ.

To form a tube in accordance with the principle outlined, therefore, a ceramic mandrel of composition which can withstand the temperature of the chemical vapor decomposition and appropriate diameter is taken and coated with a mixture of vanadium and chromium halide in heat-resistant vanadium-chromium alloy ratio which leaves behind an anti-diffusion alloy of appropriate composition, for example, 85% vanadium, 15% chromium. The amount needed is, of course, very small because the barrier is only 30 microns in thickness. This is decomposed in an atmosphere of hydrogen at a temperature below 800° C. The total time required depends on the alloy, temperature, hydrogen flow and dimensions. End point is determined by gas composition. After completion of the diffusion barrier, the heat-resistant vanadium-titanium-X alloy is formed in the same way. Thus, titanium fluoride 7½% chromium fluoride and the balance vanadium fluoride. This is decomposed in place in a reducing atmosphere to form a heat-resistant alloy. Subsequently the outer anti-corrosion layer is formed to a thickness of 30 microns to consist of a protective vanadium alloy with 40% titanium. The technic is the same. Namely apply the halide in appropriate ratio to give upon decomposition the desired alloy, then decompose and apply the next layer.

What I claim is:

1. Clad tubes for nuclear reactor fuels comprising (a) an outer, anti-corrosion layer comprising a binary vanadium-base alloy, (b) a main layer integrally joined to said outer layer comprising a vanadium-titanium-X alloy wherein X is selected from the group consisting of chromium and columbium, and (c) an inner, anti-diffusion layer integrally joined, in turn, to said main layer comprising a vanadium alloy selected from the group consisting of vanadium-chromium alloys, vanadium-rhenium alloys and vanadium-titanium-X alloys wherein X is selected from the group consisting of chromium and columbium; the vanadium proportion in these alloys being at least about 50%, by weight.

2. The clad tube of claim 1, wherein said outer layer has a coating thickness of 30 to 150 microns.

3. The clad tube of claim 1, wherein said inner layer has a thickness of 10–100 microns.

4. The clad tube of claim 1, wherein (a) said outer layer is a vanadium-titanium alloy containing from about 40 to 50% of titanium by weight, (b) said main layer is a vanadium-titanium-X alloy containing from about 3 to 50% of titanium, by weight, and from about 5 to 20% of the X component, by weight, and (c) said inner layer is selected from the group consisting of vanadium-15% chromium alloy, vanadium-20% chromium alloy, vanadium-5% rhenium alloy, and vanadium-titanium-X alloy containing from about 3 to 50% of titanium, by weight, and from about 5 to 20% of the X component, by weight.

5. The clad tube of claim 1, wherein the grain size of the pyrolytic alloys is stabilized and minimized by a residual fluor concentration of 10 to 30 p.p.m.; said residual fluor concentration being that fluor concentration remaining in the alloy subsequent to the pyrolytic decomposition of a mixture of fluorides and chlorides of the alloy elements in the preparation of said clad tubes.

References Cited

UNITED STATES PATENTS

| 3,148,953 | 9/1964 | Goto | 29—198 |
| 3,367,022 | 2/1968 | Hill | 29—198 |
| 3,426,420 | 2/1969 | Grant | 29—198 |
| 3,436,258 | 4/1969 | Neugebauer | 29—198 |

HYLAND BIZOT, Primary Examiner

U.S. Cl. X.R.

29—198